(No Model.)
E. R. KNOWLES.
ELECTRICAL INDICATOR.
No. 409,207. Patented Aug. 20, 1889.
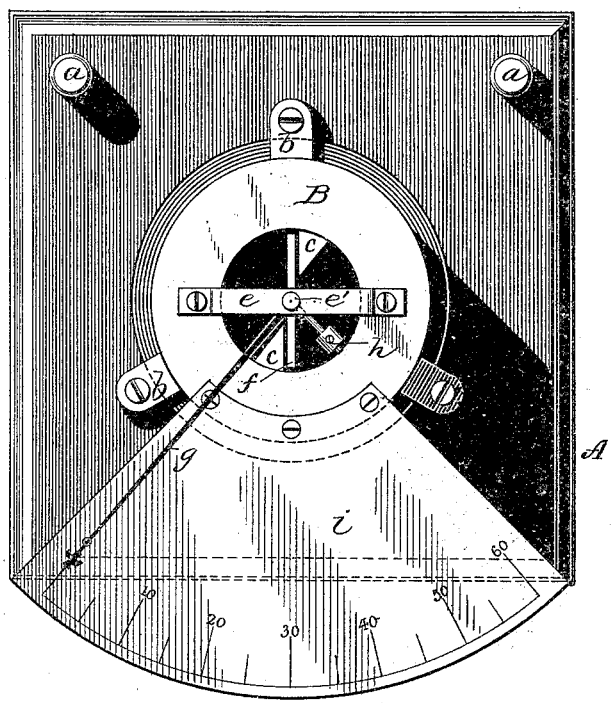
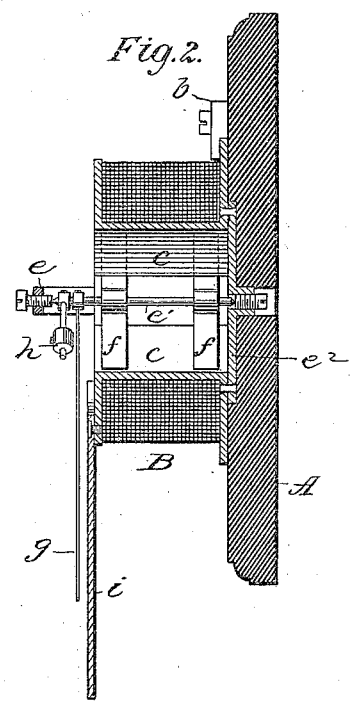
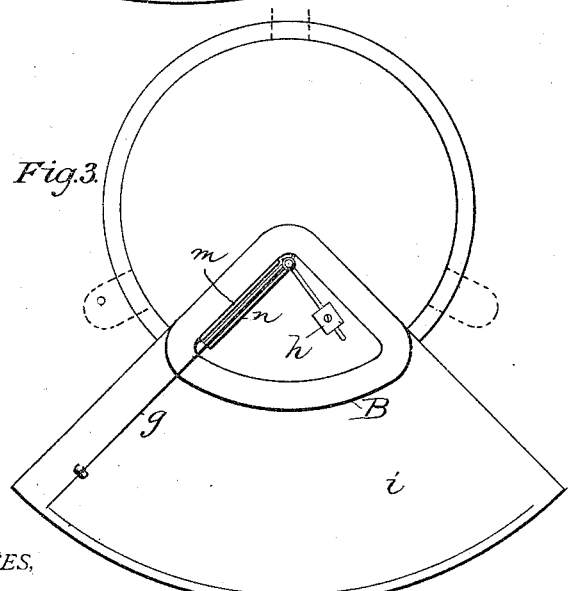
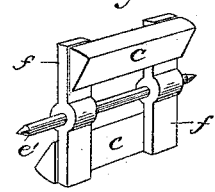
WITNESSES,
INVENTOR.
Edward R. Knowles.
ATTORNEY.

UNITED STATES PATENT OFFICE.

EDWARD R. KNOWLES, OF BROOKLYN, NEW YORK.

ELECTRICAL INDICATOR.

SPECIFICATION forming part of Letters Patent No. 409,207, dated August 20, 1889.

Application filed February 14, 1889. Serial No. 299,843. (No model.)

*To all whom it may concern:*

Be it known that I, EDWARD R. KNOWLES, a citizen of the United States, residing at Brooklyn, in the county of Kings and State of New York, have invented certain new and useful Improvements in Electrical Indicators, of which the following is a specification.

The invention pertains to instruments for indicating the strength of electric currents.

The object of the invention is to provide a simple form of indicator which shall be cheap of manufacture, and which may be easily adjusted when once it has become out of adjustment.

The invention consists in the details of construction which will be hereinafter described, and particularly pointed out in the claims.

In the accompanying drawings, Figure 1 represents a front elevation of the indicator; Fig. 2, a vertical central section of the same; Fig. 3, a view of a modified form of the indicator, and Fig. 4 a detail view of the mechanism inclosed within the coil.

The device is mounted upon a suitable base or board A. The main binding-posts of the instrument are represented by $a\ a$.

B represents a coil of wire, through which the current to be measured flows. This coil is wound upon a brass spool whose flanges are of unequal diameter, the flange next to the base being wider than the outer flange. The coil is secured to the base by three or more clips $b$. The clips are secured to the board by screws, which may be tightened or loosened at pleasure. By this construction the spool may be conveniently removed from the base-board; or by loosening the screws in the clips it may be rotated in its seat for purposes of adjustment, the object of which will appear later on.

A cylindrical space or chamber of some considerable diameter is formed within the spool, and I have fixed to the walls of the chamber, at diametrically-opposite points, two triangular pieces $c\ c$ of soft iron, which extend the full length of the coil, their apices pointing toward each other in the manner shown. The exact form of these pieces is best shown in Fig. 4.

I have arranged a bridge or bracket $e$ across the front opening of the chamber, which supports a bearing for the shaft $e'$, the other bearing being formed in a metal plate $e^2$, attached to the rear flange of the spool. These bearings should be of very fine quality, in order that the friction may be as little as possible. To this end I have hardened the ends of the shaft and made them of conical shape. They are seated in the ends of adjustable screws, which pass through the bridge-piece and the metallic plate at the rear. I am thus enabled to adjust the bearings to compensate for wear.

The shaft $e$ carries two soft-iron wings or arms $f\ f$, which are mounted thereon wholly within the chamber in the spool and at each end thereof. The shaft also carries an index or pointer $g$ and a counterbalancing-weight $h$ therefor. Both the pointer and the weight are adjustably mounted on the shaft, and the weight itself is also adjustably fixed to the arm which supports it. The pointer moves in front of a scale engraved or otherwise indicated upon a plate $i$, which is secured by screws or otherwise to the front or outer flange of the spool. The normal positions of the parts when in working order are as shown in Fig. 1, wherein the index points to the zero-mark of the scale, and the wings $f\ f$ are upon opposite sides of the two triangular pieces $c\ c$ in the manner shown.

The operation of the indicator is as follows: An electric current flowing through the coil will magnetize one of the wings $f$ and that portion of the pieces $c\ c$ adjacent to it positively, while the other wing $f$ and the adjacent iron will be magnetized negatively. This will cause a universal repulsion of the adjacent pieces of iron, and the shaft $e$ will be rotated in accordance with the force of the repulsion. The amount of this repulsion will be indicated by the index upon the scale from which it may be read.

I am aware that repulsion-indicators are not new; but, as before stated, my object is to provide an indicator which may be easily adjusted. When the instrument is to be used, it is hung upon the wall or other support, and if not in perfect adjustment by loosening the screws in the clips $b$ the spool may be rotated until the index points exactly to the zero-mark of the scale. By making the index and the counter-weight adjustable, the whole apparatus may be balanced to a nicety.

It is obvious that the two lower clips supporting the spool may be always more or less loose, and in that case it is only necessary to unloosen the screw in the upper clip for purpose of adjustment.

Fig. 3 shows a modification of the device. The coil is triangular in shape, and a leaf or plate $m$ of soft iron is fixed in one side of the triangle to serve as a pole-piece, and a simple plate or piece of soft iron $n$ is attached to the shaft. The shaft is counterbalanced, as before. The adjustment in this form of indicator is the same as that hereinbefore described, the triangular coil being mounted upon a circular plate, which is retained in place by the clips, as shown.

It is obvious that in cases where the diameter of the coil is sufficient the scale may be marked or indicated directly upon the flange of the spool. Then by shortening the pointer or index the apparatus may be found to be as efficient as the one I have herein described.

Having described my invention, I claim—

1. In an electrical indicator, a coil or helix through which the main current passes, having marked upon its supporting-spool or upon a plate rigidly attached thereto a scale, the said coil and its spool being adjustably mounted upon a support or base, all in combination with an index or pointer whose movements are controlled by the magnetism induced by the helix, the said pointer being hung and normally balanced upon a shaft.

2. In an electrical indicator, a balanced shaft carrying an index or pointer, a magnet exerting its influence to rotate said shaft, a scale rigidly attached to the frame of said magnet, the magnet being rotably adjustable to bring any desired point on the scale into coincidence with the index or pointer.

3. The combination, with the magnet-coil, having attached thereto a scale, of the adjustable clips $b$, for the purpose described.

In witness whereof I have hereunto signed my name in the presence of two subscribing witnesses.

EDWARD R. KNOWLES.

Witnesses:
WM. A. ROSENBAUM,
F. C. GRUEN.